United States Patent
Rajanummi et al.

(10) Patent No.: US 7,789,997 B2
(45) Date of Patent: Sep. 7, 2010

(54) DEVICE FOR CLEANING OF A FILTER NET OF A PULP DRYER'S FAN TOWER, A PULP DRYER'S FAN AND A PULP DRYER

(75) Inventors: Kimmo Rajanummi, Naantali (FI); Johan Lindholm, Turku (FI)

(73) Assignee: Metso Paper, Inc., Helsinki (FI)

( * ) Notice: Subject to any disclaimer, the term of this patent is extended or adjusted under 35 U.S.C. 154(b) by 759 days.

(21) Appl. No.: 11/629,643

(22) PCT Filed: Jun. 13, 2005

(86) PCT No.: PCT/FI2005/000271

§ 371 (c)(1),
(2), (4) Date: Apr. 9, 2007

(87) PCT Pub. No.: WO2005/124017

PCT Pub. Date: Dec. 29, 2005

(65) Prior Publication Data

US 2008/0011440 A1    Jan. 17, 2008

(30) Foreign Application Priority Data

Jun. 18, 2004    (FI) .............................. 20040247 U

(51) Int. Cl.
*D21G 3/00* (2006.01)
(52) U.S. Cl. ............................ 162/272; 15/301; 34/418; 55/285
(58) Field of Classification Search ................. 162/272; 15/301; 34/418; 55/285, 290, 294, 304
See application file for complete search history.

(56) References Cited

U.S. PATENT DOCUMENTS

| | | | |
|---|---|---|---|
| 2,864,176 A | 12/1958 | Backlert et al. | |
| 3,233,391 A | 12/1962 | Olsen | |
| 3,306,012 A | 2/1967 | Wallin | |
| 3,991,482 A | 11/1976 | Brock et al. | |
| 5,217,512 A * | 6/1993 | Williams | ..................... 96/425 |

(Continued)

FOREIGN PATENT DOCUMENTS

FR    2 533 141    3/1984

(Continued)

OTHER PUBLICATIONS

International Search Report for International application No. PCT/FI2005/000271 dated Sep. 28, 2005.

*Primary Examiner*—Mark Halpern
(74) *Attorney, Agent, or Firm*—Cohen Pontani Lieberman & Pavane LLP

(57) ABSTRACT

A device for cleaning a filter net of a pulp dryer fan tower includes a nozzle guide connectable to a filter net of a fan tower in a pulp dryer and at least one nozzle movably arranged on the nozzle guide. At least one connection is arranged on the nozzle for connecting a vacuum pressure to the at least one nozzle. The nozzle guide includes a rail or a threaded rod and an intermediate part connected between the nozzle and the rail or threaded rod. An actuatable power device is configured for moving the nozzle relative to the rail or threaded rod, wherein said at least one nozzle is arranged and dimensioned for cleaning the filter net during the movement relative to the rail or threaded rod.

15 Claims, 3 Drawing Sheets

U.S. PATENT DOCUMENTS 5,827,338 A * 10/1998 Horvat .................. 55/285
5,980,598 A * 11/1999 Horvat .................. 55/294

FOREIGN PATENT DOCUMENTS

| SU | 870547 | 10/1981 |
|---|---|---|
| SU | 1694474 | 11/1991 |
| WO | WO 98/43722 | 10/1998 |
| WO | WO 00/61863 | 10/2000 |
| WO | WO 01/34905 | 5/2001 |

* cited by examiner

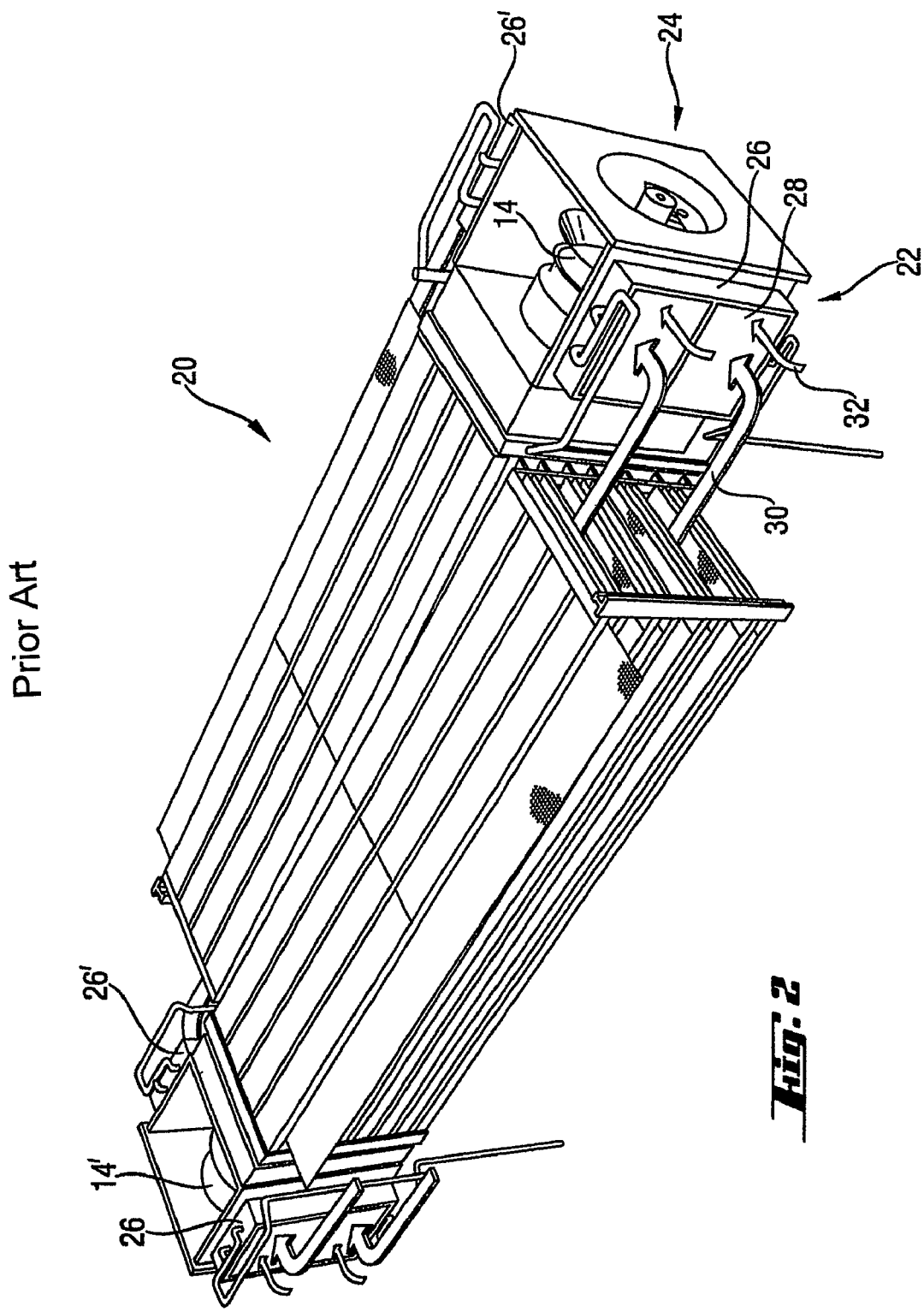

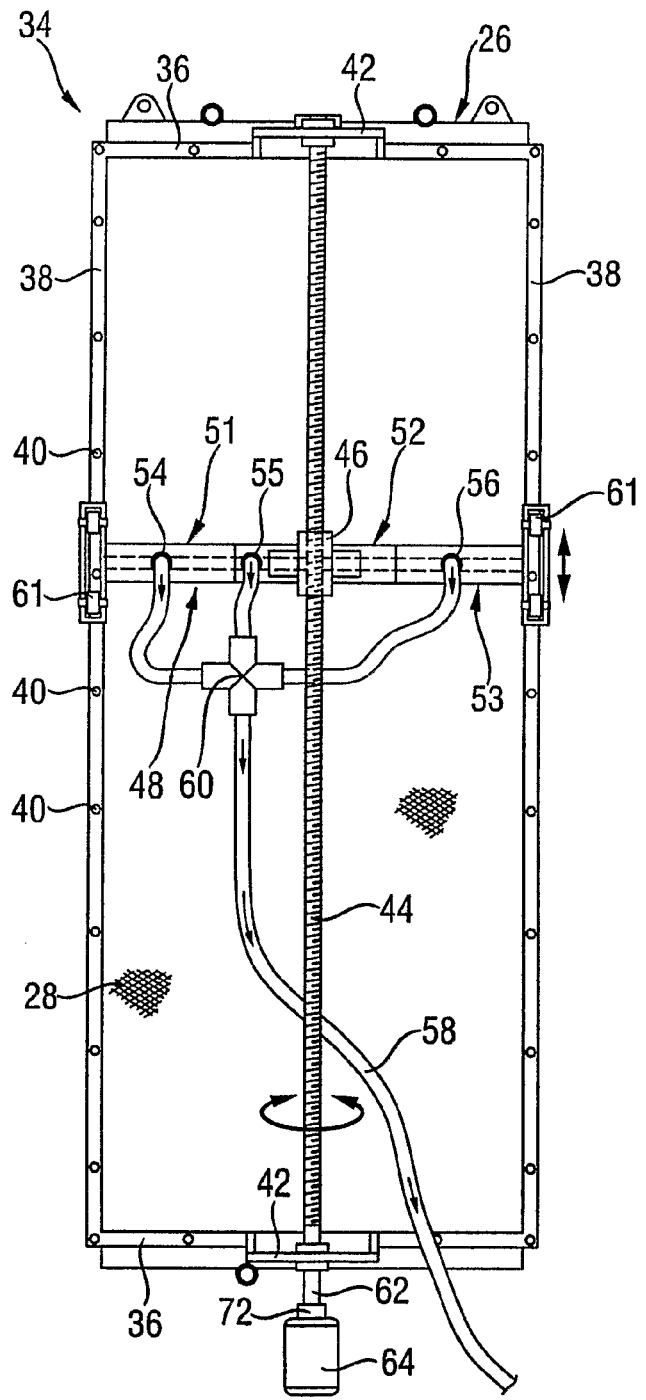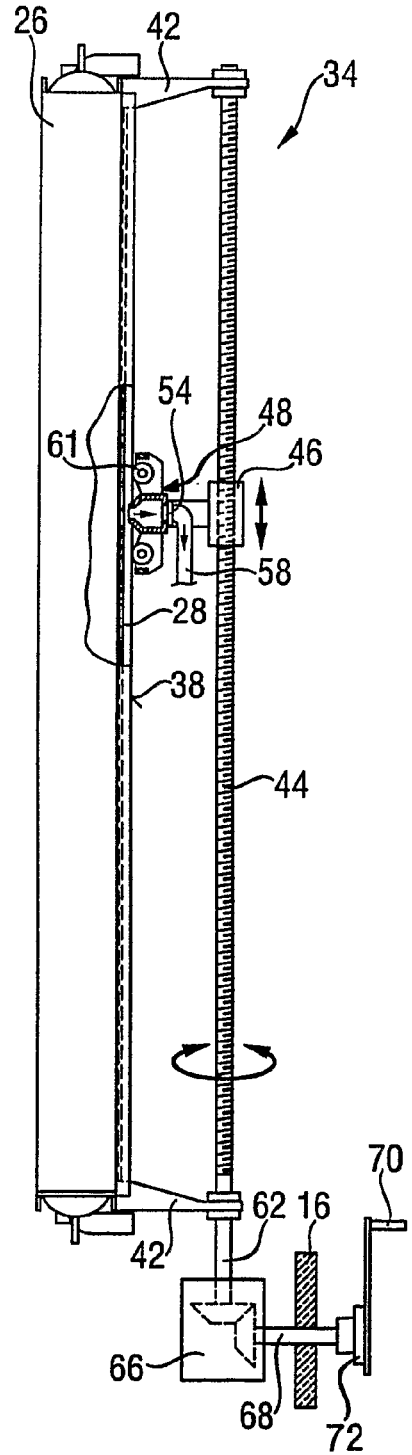

DEVICE FOR CLEANING OF A FILTER NET OF A PULP DRYER'S FAN TOWER, A PULP DRYER'S FAN AND A PULP DRYER

PRIORITY CLAIM

This is a U.S. national stage of application No. PCT/FI2005/000271, filed on Jun. 13, 2005. Priority is claimed on the following application: Country: Finland, Application No.: U20040247, Filed: Jun. 18, 2004.

BACKGROUND OF THE INVENTION

1. Technical Field of the Invention

The object of the invention is a device and a method for cleaning of a filter net of a pulp dryer's fan tower, a pulp dryer's fan tower and a pulp dryer. The invention relates especially to a new manner of arranging vacuum-cleaning at limited areas of a pulp dryer, which are difficult to vacuum-clean, such as at the filter net of a fan tower.

2. Prior Art

A typical pulp dryer of prior art comprises an actual dryer section in which a pulp web is dried in air flotation drying with hot air jets or the like, at least one, usually several recirculation fans arranged adjacent to the actual dryer section with which recirculation fans humid air is discharged from the actual dryer section and heated air is blown as drying air into the actual dryer section, and heating devices with which the discharged humid air is heated before returning it as drying air into the actual dryer section.

Several fans operating side by side are usually arranged on top of each other in order to create so called fan towers, a necessary amount of which fan towers, in turn, are arranged side by side. The fans are mounted in the fan tower so that their suction openings are confined to the front and back side of the fan tower, seen from the running direction of the web to be dried. Heating devices are arranged on the back and front sides of the fan towers, in front of the blowers' suction openings, which heating devices heat the humid air discharged from the dryer section before the fans.

In front of the heating devices, i.e. on their inlet side there is usually arranged a filter net or the like to prevent shredded paper, fibers, dust or the like from entering the heating device and the blower. Dust sticks to the filter net, which then has to be cleaned every now and then.

Cleaning of the filter nets of a pulp dryer's heating devices, such as steam radiators, nowadays takes place manually with a vacuum-cleaner. The cleaning is performed e.g. once or few times a week. Thus, the person operating the vacuum-cleaner must, at least partly, enter the space between the fan towers, where the temperature is high, even over 100° C., and where the humidity is also high. The vacuum-cleaning is usually performed with a vacuum-cleaning duct connected to the mill's central vacuum system and having a nozzle at its end. The nozzle is moved manually on the surface of the filter net to be vacuum-cleaned. The work is hard, very unpleasant and unergonomic.

Due to the reasons stated above, it is difficult to perform the vacuum-cleaning with sufficient care, and it is therefore not always done often enough. When performing the vacuum-cleaning by hand, it is also difficult to reach well enough for example behind the steam pipes, support elements, beams or the like. Inadequate vacuum-cleaning causes an increase of pressure loss and a reduction in the amount of air in the recirculation fans. This leads, in the dryer section, to an impaired air flotation ability of the pulp web, and to runnability problems. Production is naturally also decreased. Thus, this working phase should be eliminated or it should be made easier to perform.

The Finnish patent publication FI 108882 B describes a pulp dryer's filter net, which is movable in the direction of the inlet side plane of the blast air heating device, and movable to a specific cleaning device, at least partly away from the front of the heating device's inlet side. The solution requires a specific mechanism for moving the filter net.

SUMMARY

It is an aim of the present invention to reduce or even eliminate the above-mentioned problems of prior art.

It is an aim of the present invention especially to provide a solution, with which the cleaning of the filter nets of blast air heating devices in a pulp dryer will succeed well in terms of quality without any deterioration in the working ergonomics for the user.

The embodiments and advantages mentioned in this text relate, where applicable, both to the device and method for cleaning the filter net of a pulp dryer's fan tower, to the pulp dryer's fan tower, as well as to the pulp dryer according to the invention, even though it is not always specifically mentioned.

The object of the invention is met by a device according to the invention for cleaning the filter net of a pulp dryer's fan tower comprising at least one nozzle, at least one connection, such as a hose to be connected to the vacuum system and the required connectors, for leading underpressure to the nozzle, a nozzle guiding means, such as a rail or a threaded rod, which is arranged in connection with the filter net at least mainly in an immobile manner and into which guiding means the nozzle is fixed in a mobile manner, and power means for moving the nozzle in relation to the guiding means. The power means can comprise for example the required power transmission means and connector in order to transmit the power obtained from an actuator to the power means. The actuator can be for example an electric motor or a crank.

A typical fan tower of a pulp dryer according to the invention comprises at least one fan with which humid air is arranged to be discharged from the actual dryer section and with which heated air is arranged to be blown as drying air into the actual dryer section, a heating device, such as a steam radiator or some other suitable heat exchanger, fitted on the suction side of said at least one fan in order to reheat the humid air discharged from the actual dryer section, a filter net or the like, fitted in front of the heating device, on its inlet side, in order to filter the air to be heated before heating, and a cleaning device according to the invention in order to clean the filter net or the like.

In a typical embodiment of the invention, the fan tower comprises at least two superimposed fans. There may be just one fan, but usually there are several, for example three, four, five, six or even more fans on top of each other. Then it is especially advantageous if the cleaning device according to the invention is arranged to clean the filter net of the upmost fan or few upmost fans. Namely, the upmost parts of a pulp dryer usually get dirty quicker than the other parts. Thus, great benefit is gained even by a minor cleaning device investment.

A typical pulp dryer according to the invention comprises an actual dryer section in which a pulp web is arranged to be dried with hot air jets or the like, at least one fan tower according to the invention arranged adjacent to the actual dryer section, with which fan tower humid air is arranged to be discharged from the actual dryer section and with which heated air is arranged to be blown as drying air into the actual dryer section.

A typical method according to the invention for cleaning of the filter net of a pulp dryer's fan tower comprises at least the following steps:

Moving of one or more nozzles in relation to the filter net. Thus, the nozzle is typically moved along the filter net and in the immediate vicinity of the filter net.

Leading of underpressure to the nozzle via one or more connections. Thus, air and dirt coming off from the filter net flows inside the nozzle through the suction opening of the nozzle. Air and dirt are led further via underpressure connections for example to a suitable filtering apparatus where dirt is removed from the air.

Supporting of the movable nozzle with nozzle guiding means arranged in connection with the filter net at least mainly in an immobile manner. Thus, the nozzle moves in relation to the nozzle guiding means.

Producing with power means the power needed for moving of the nozzle in relation to the filter net. Thus, the power means are functionally connected to the nozzle moved by said power means.

With the aid of the invention, a pulp dryer works more economically and reliably and with a more even capacity than before. Pulp dried with a pulp dryer according to the invention may even be of a more uniform quality than pulp produced with other dryers. Working as an operator of a pulp dryer according to the invention is safer and more comfortable than before. A cleaning device according to the invention can be fitted as part of a new built fan tower or pulp dryer, but it can also be retrofitted in an existing fan tower or pulp dryer.

According to an embodiment of the invention, the filter net and the nozzle guiding means are arranged so as to be mainly vertical. Parts that are arranged in parallel are space saving and easy to build so as to be secure in operation and uniform in quality of cleaning.

According to an embodiment of the invention, the nozzle guiding means comprise conducting means, e.g. rails or a threaded rod, and a counterpart arranged between the nozzle and the conducting means and fit for the conducting means. The threaded rod or the rails are a simple and reliable manner of moving the nozzles along a desired course.

An embodiment of the invention comprises power transmission means, such as a rotatable shaft, a switch or a chain gear in order to transmit the nozzle moving power from the actuator i.e. from the power source to the nozzle. The power source, such as a crank rotated by hand is advantageously arranged at a distance from the hot and humid space between the fan towers. Therefore, some kind of power transmission means are usually needed.

According to an embodiment of the invention, the nozzle guiding means comprise a threaded rod arranged in connection with the filter net. Then, a counterpart connected to the nozzle and fit for the threads of the threaded rod is typically arranged between the threaded rod and the nozzle. A threaded rod is a very simple and reliable manner of arranging the moving of the nozzles.

According to an embodiment of the invention, at least one wheel arranged towards the filter net is arranged in the nozzle. The wheel or wheels lighten the movement of the nozzle towards the filter net and reduce damage caused to the device.

If a track, such as a fastening strip of the filter net's edge, is arranged over the filter net or beside it, then the wheels can be arranged to travel along this track. Thereby the rotation of the wheels can be arranged to be even lighter. At the same time, damage to the nozzle or filter net is further reduced.

According to an embodiment of the invention, the power means comprise a connector connected to the nozzle with power transmission means and arranged to be rotatable, into which connector an actuator, such as a crank, a screw latch or an electric motor can be arranged. A connector of this kind is easy to arrange in a pulp dryer, for instance outside the wall, where it is easily and effortlessly rotated.

BRIEF DESCRIPTION OF THE FIGURES

The invention is described in more detail below with reference to the enclosed schematic drawing, in which

FIG. 2 is a perspective top view of one part of a pulp dryer, wherein a conventional filter net is connected to the fan;

FIG. 3 is a front view of a cleaning device according to the invention mounted in connection with the drying air filter net; and FIG. 4 is a side view of the cleaning device, filter net and steam radiator of FIG. 3.

DETAILED DESCRIPTION OF THE EMBODIMENTS OF THE FIGURES

Figure 1:
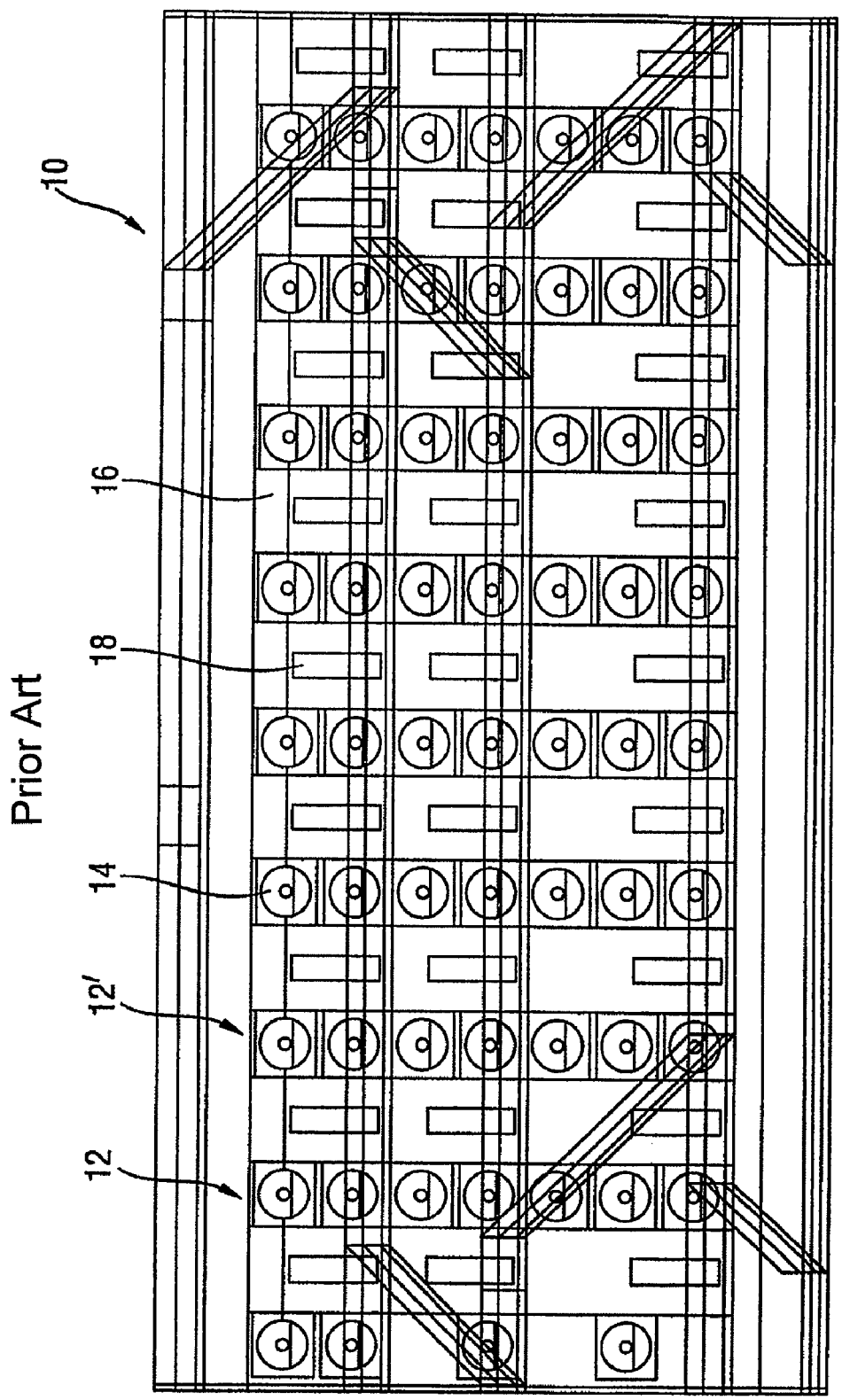
FIG. 1 is a side view of a typical prior art pulp dryer, wherein a device according to the invention for cleaning of the drying air can be fitted.

FIG. 1 shows a conventional pulp dryer 10 comprising several adjacent fan towers 12, 12', which each have seven fans 14 placed on top of each other. The sides of the pulp dryer are closed with walls 16 arranged between the fan towers. The walls are provided with doors 18 allowing access e.g. to clean the filter nets arranged in front of the fans and heating devices. A pulp dryer provided with devices according to the invention would have a mainly identical side view.

FIG. 2 shows a part of a conventional pulp dryer. Fans 14, 14' are arranged on both sides of the pulp dryer's actual dryer section 20 functioning with air flotation drying. Vertical steam radiators 26, 26' are arranged in front of the suction openings of the fans, on the front side 22 and on the back side 24 as seen in the machine direction. The vertical sides of the steam radiators 26, 26' are covered with a fixed or detachable filter net 28.

Humid air flows, as shown by an arrow 30, from the actual dryer section through the filter net 28 and the steam radiator 26 into the fan 14. A small amount of compensation air is absorbed also into the fan, as shown by arrows 32. The fan blows the heated air back to the actual dryer section.

The filter net shown in FIG. 2 needs to be cleaned from time to time by vacuum-cleaning the dust remaining on the surface of the net 28. The figure shows that then the operator usually has to stand in the humid, hot and dusty air flow 30.

FIG. 3 shows a device 34 according to the invention for cleaning of the filter net 28 of a pulp dryer's fan tower 12, 12'. The filter net 28 of FIG. 3 and the steam radiator 26 seen behind it have the height of two fans 14. The filter net can be arranged to have a desired height, for example the height of a fan tower 12, 12' comprising one or even several fans. The filter net and the device 34 cleaning it can have even the height of the entire fan tower 12, 12'. The fans are not shown in FIGS. 3 and 4. The filter net 28 is fastened by its edges into slots of horizontal strips 36 and vertical strips 38 having a U-shaped cross-section. The strips 36 and 38 are fastened with bolts or other fastening means 40 to the steam radiator 26.

The cleaning device 34 comprises a threaded rod 44 fastened with iron supports 42 to the steam radiator 26 and to the filter net 28. The threaded rod or bar 44 i.e., a trapezoidal threaded rod or bar, is arranged so as to be mainly vertical and to be in the direction of the filter net 28 plane. The threaded rod 44 is pivoted at its ends on iron supports 42 and thereby arranged to be rotatable around its longitudinal axis. The threaded rod 44 has threads on its surface. On the threaded rod, there is arranged a sleeve-like counter part 46 having on its inner surface threads fit for the threads of the threaded rod. A mainly horizontal nozzle packet 48 is detachably but firmly fixed in the counterpart 46.

A nozzle packet 48 according to the invention consists of one or more usually adjacent nozzles depending on the width of the surface to be vacuum-cleaned. If there are several nozzles, the nozzle packet may present an option of choosing two or even just one nozzle to be active at a time, whereby the rest of the nozzles are lifted up from the surface to be vacuum-cleaned and locked in that position with some suitable means. Then, underpressure is typically led only to the active nozzles in order to obtain the best vacuum-cleaning output. Leading of underpressure can be controlled by detaching the suction hose of the inactive nozzles' connections or by closing the valves arranged in ducts leading to these nozzles. These means for lifting, detaching and closing the nozzles and hoses are not presented.

The nozzle packet 48 of FIGS. 3 and 4 has three adjacent nozzles 51, 52, 53. The nozzle edges provided with suction openings are close to the filter net 28 or even in touch with it. Bristles (not shown) touching the filter net can be arranged in the nozzle edge provided with suction opening. Connections 54, 55, 56 leading to the nozzles are shown in FIG. 3. A vacuum-cleaning hose 58 connected to the connections 54, 55, 56 and a branching body 60 arranged between the hose and the connections 54-56 is shown is FIG. 3. The nozzle packet has the width of the entire filter net 28. Both ends of the nozzle packet 48 are provided with wheels 61, which fall to the vertical fastening strips 38 of the filter net.

In FIG. 3, the lower end 62 of the threaded rod is provided with a connector 72 into which an electric motor 64 is coupled in order to rotate said connector. In FIG. 4, the lower end 62 of the threaded rod is provided with a right angle gear 66 with a shaft 68 projecting therefrom. The shaft 68 penetrates the pulp dryer wall 16. Outside the wall at the end of the shaft 68 there is a connector 72 into which a crank 70 is arranged in the example of FIG. 4. The connectors 72 could also suit for example to a screw latch.

When in use, the vacuum-cleaning device 34 is connected during the vacuuming action with a vacuum-cleaning hose 58 to an underpressure system, for example to the mill's central vacuum system. In order to create underpressure at the nozzles 51-53, the hose 58 is connected to the branching body 60 of the nozzle packet. The nozzle packet is moved vertically on the filter net 28 by rotating the threaded rod 44 around its longitudinal axis. The rotation power is obtained whether from the electric motor of FIG. 3 or from the crank of FIG. 4, advantageously from the outside of the dryer 10. The rotation power can be obtained also from some other suitable source, for example from an electrical or an air-powered screw latch connected to the shaft 68 of FIG. 4. The wheels 61 at the edge of the nozzle packet 48 reduce the friction acting against the movement, as well as damages to the filter net 28 and the nozzles 51-53. If the wheels 61 are arranged to travel along the vertical strips 38, damage caused to the filter net 28 is further reduced.

By rotating the threaded rod 44 in different directions, the nozzle packet 48 is made to move vertically up and down by changing the direction of rotation. Sensors or other means can be connected to the device in order to determine and fix the location of the nozzle packet 48. The device 34 can also be arranged to be wholly automatic so that the electric motor 64 and the cleaning are controlled by an automatic control system at certain intervals.

Power transmission can, of course, be arranged in many different ways. For example, the threaded rod can be replaced with rails along which the nozzle packet is arranged to travel. The travelling power of the nozzle packet can be transmitted from a power source for example via chains or cogged wheels.

The trapezoid thread bar or some other power transmission can be covered against dirt for example with an elastic sock-type cover, for example a so-called bellows rubber. If a switch is used for power transmission, its transmission can be arranged so as to be suitable for each case.

Only one advantageous embodiment of the invention is shown in the figures. Facts of secondary importance regarding the main idea of the invention, facts known as such or apparent for a person skilled in the art, such as support structures possibly required by the invention, are not separately shown in the figures. It is apparent to a person skilled in the art that the invention is not limited exclusively to the examples described above, but the invention can vary within the frames of the claims presented below. The dependent claims present some possible embodiments of the invention, and they are not to be considered to restrict the scope of protection of the invention as such.

What is claimed is:

1. A device for cleaning a filter net of a fan tower in a pulp dryer, said device comprising:
    a nozzle guide fixedly connectable to a filter net of a fan tower in a pulp dryer;
    a nozzle packet comprising adjacent nozzles, the nozzle packet being movably arranged on said nozzle guide;
    connections for connecting a vacuum pressure to said at least one nozzle nozzles of the nozzle packet, the nozzle guide comprising at least one of a rail and a threaded rod, and an intermediate part connected between said nozzle packet and said at least one of a rail and a threaded rod; and
    an actuatable power device configured for moving the nozzle packet relative to said at least one of a rail and a threaded rod, wherein said nozzle packet is arranged and dimensioned for cleaning the filter net during movement of the nozzle packet relative to said at least one of a rail and a threaded rod.

2. The device of claim 1, wherein said nozzle guide is arranged to be substantially vertically mounted on the filter net.

3. The device of claim 1, further comprising a power transmission having one of a rotatable shaft, a gear, or a chain transmission configured for transmitting power from said actuatable power device so as to move said nozzle packet relative to said at least one of a rail and a threaded rod.

4. The device of claim 1, wherein said nozzle guide comprises a threaded rod, and wherein said intermediate part is threadably received on said threaded rod.

5. The device of claim 1, further comprising a wheel arranged on said nozzle packet and facing the filter net to be cleaned.

6. The device of claim 5, wherein said nozzle guide comprises a rail arrangeable over the filter net, said wheel being arranged to travel along said rail when said nozzle packet moves in response to said actuatable power device.

7. The device of claim 6, wherein said rail comprises a fastening strip positionable along an edge of the filter net.

8. The device of claim 1, wherein said actuatable power device includes a connector connected to said nozzle packet with a power transmission and one of a crank, a screw latch and an electric motor suitable for rotating said connector to move said nozzle packet.

9. The device of claim 1, wherein said nozzle guide comprises a threaded rod, and wherein the threaded rod is a trapezoid thread bar.

10. The device of claim 1, wherein the connections for connecting the vacuum pressure to said nozzles is capable of disconnecting a nozzle from the vacuum pressure.

11. A fan tower of a pulp dryer, comprising:
   at least one fan arranged for discharging humid air from a dryer section of the pulp dryer and blowing heated air as drying air into the dryer section;
   a heating device fitted on a suction side of said at least one fan and arranged to reheat the humid air discharged from the dryer section;
   a filter net fitted on an inlet side in front of said heating device to filter the air to be heated; and
   a cleaning device arranged and dimensioned to clean the filter net, wherein said cleaning device comprises the device of claim 1.

12. The fan tower of claim 11, wherein said heating device is a steam radiator.

13. The fan tower of claim 11, wherein said at least one fan comprises at least two fans in a vertically stacked arrangement.

14. The fan tower of claim 13, wherein said cleaning device is arranged in an uppermost fan of the fan tower.

15. A pulp dryer, comprising:
   a dryer section in which a pulp web is arranged to be dried with hot air jets; and
   at least one fan tower arranged adjacent to said dryer section and configured to discharge humid air from said dryer section and blow heated air as drying air into said dryer section, said at least one fan tower being a fan tower according to claim 11.

\* \* \* \* \*